(12) United States Patent
Mäkinen

(10) Patent No.: US 12,146,655 B2
(45) Date of Patent: Nov. 19, 2024

(54) LIGHT FIXTURE

(71) Applicant: LEDIL OY, Salo (FI)

(72) Inventor: Tero Mäkinen, Salo (FI)

(73) Assignee: LEDIL OY, Salo (FI)

(*) Notice: Subject to any disclaimer, the term of this patent is extended or adjusted under 35 U.S.C. 154(b) by 0 days.

(21) Appl. No.: 18/546,256

(22) PCT Filed: Feb. 21, 2022

(86) PCT No.: PCT/FI2022/050111
§ 371 (c)(1),
(2) Date: Aug. 11, 2023

(87) PCT Pub. No.: WO2022/229497
PCT Pub. Date: Nov. 3, 2022

(65) Prior Publication Data
US 2024/0302026 A1    Sep. 12, 2024

(30) Foreign Application Priority Data

Apr. 27, 2021   (FI) ..................... 20215484

(51) Int. Cl.
*F21V 8/00* (2006.01)
*F21S 8/06* (2006.01)
(Continued)

(52) U.S. Cl.
CPC .............. *F21V 7/0016* (2013.01); *F21S 8/06* (2013.01); *F21V 7/0091* (2013.01); *F21V 7/09* (2013.01);
(Continued)

(58) Field of Classification Search
CPC ........ F21V 7/0016; F21V 7/0091; F21V 7/09; F21V 7/24; F21S 8/06; F21Y 2103/10; F21Y 2115/10
See application file for complete search history.

(56) References Cited

U.S. PATENT DOCUMENTS

2014/0071693 A1  3/2014  Zhang et al.
2015/0049479 A1  2/2015  Clark et al.
(Continued)

FOREIGN PATENT DOCUMENTS

DE   202013101828 U1   7/2014
DE   202015101666 U1   5/2015
(Continued)

OTHER PUBLICATIONS

Finland Search Report for FI20215484 dated Nov. 17, 2021, 2 pages.
(Continued)

*Primary Examiner* — Elmito Breval
(74) *Attorney, Agent, or Firm* — NIXON & VANDERHYE

(57) ABSTRACT

A light fixture includes side wall sections having first surfaces facing towards each other, a light source on the first surface of at least one of the side wall sections and positioned so that a maximum intensity direction of a light distribution pattern of the light source is towards the other side wall section, and a lens section that constitutes an optical diverter that directs a first part of light emitted by the light source obliquely via a gap between first edges of the side wall sections and a second part of the light obliquely via a gap between second edges of the side wall sections. Thus, the light fixture can illuminate both a floor and a ceiling so that light emitted to unwanted directions and potentially causing unwanted bright spots and/or glare can be kept at a low level.

19 Claims, 5 Drawing Sheets

(51) Int. Cl.
*F21V 7/00* (2006.01)
*F21V 7/09* (2006.01)
*F21V 7/24* (2018.01)
*F21Y 103/10* (2016.01)
*F21Y 115/10* (2016.01)

(52) U.S. Cl.
CPC ............ *F21V 7/24* (2018.02); *F21Y 2103/10* (2016.08); *F21Y 2115/10* (2016.08)

(56) References Cited

U.S. PATENT DOCUMENTS

| | | |
|---|---|---|
| 2015/0219833 A1 | 8/2015 | Dau et al. |
| 2016/0327232 A1 | 11/2016 | Krotseng et al. |

FOREIGN PATENT DOCUMENTS

| | | |
|---|---|---|
| DE | 102016002072 A1 | 8/2017 |
| WO | 2015133233 A1 | 9/2015 |
| WO | 2019219520 A1 | 11/2019 |

OTHER PUBLICATIONS

International Search Report for PCT/FI2022/050111 mailed Jun. 30, 2022, 4 pages.
Written Opinion of the ISA for PCT/FI2022/050111 mailed Jun. 30, 2022, 5 pages.

LIGHT FIXTURE

CROSS-REFERENCE TO RELATED APPLICATIONS

This application is the US national stage of PCT/FI2022/050111, filed Feb. 21, 2022, and designating the United States, which claims the priority of FI 20215484, filed Apr. 27, 2021. The entire contents of each foregoing application are incorporated herein by reference.

FIELD OF THE DISCLOSURE

The disclosure relates generally to illumination engineering. More particularly, the disclosure relates to light fixture that can be for example a pendant luminaire. Furthermore, the disclosure relates to a lighting system.

BACKGROUND

Distribution of light produced by a light fixture can be important or even critical in some applications. The light fixture comprises one or more light sources each of which may comprise, for example but not necessarily, one or more light emitting diodes "LED", one or more filament lamps, or one or more gas-discharge lamps. Furthermore, the light fixture comprises typically means for modifying a light distribution pattern of the one or more light sources, such as for example lampshades and/or optical devices made of transparent material such as e.g. glass or optical silicone. In many office environments, it is desired that light is directed not only towards a floor but towards a ceiling, too. A commonly used solution is to use linear pendant luminaires which have an open top side. A linear pendant luminaire may comprise for example a fluorescent tube or two LED strips facing up and down since LEDs are not omnidirectional.

A known solution to avoid a need for two LED strips is to use a light fixture where light is emitted through side surfaces, too. However, in conjunction with many existing light fixtures where light is emitted through side surfaces, a part of the light is emitted obliquely downwards in directions in which the light may cause undesired glare. Because the emission through the side surfaces may cause glare, there are many limitations concerning positioning of light fixtures of the kind mentioned above in a lighting system for illuminating an office or another room. Therefore, there is a need for light fixtures where a distribution of light is modified so that a part of the light is directed downwards to a floor according to a desired light distribution, another part of the light is directed to a ceiling according to another desired light distribution, and light emitted to unwanted directions and potentially causing glare can be kept at a sufficiently low level. Furthermore, it is advantageous if a technology used in a light fixture allows different designs enabling different outlooks of a light fixture.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new light fixture that can be for example a pendant luminaire.

A light fixture according to the invention comprises:
first and second side wall sections being a distance away from each other and having first surfaces facing towards each other,
a light source on the first surface of the first side wall section and positioned so that a maximum intensity direction of a light distribution pattern of the light source is towards the second side wall section, and
a lens section made of transparent material having a refractive index greater than one and placed to cover the first light source.

The lens section constitutes an optical diverter configured to direct a first part of light emitted by the light source obliquely via a gap between first edges of the first and second side wall sections and a second part of the light emitted by the light source obliquely via a gap between second edges of the first and second side wall sections so that a first angle between a maximum intensity direction of the first part of the light and a direction perpendicular to the first and second side wall sections is smaller than a second angle between a maximum intensity direction of the second part of the light and the direction perpendicular to the first and second side wall sections.

A light fixture according to an exemplifying and non-limiting embodiment is two-sided so that the light fixture further comprises another light source on the first surface of the second side wall section and positioned so that a maximum intensity direction of a light distribution pattern of the other light source is towards the first side wall section, and another lens section placed to cover the other light source and being mirror symmetrical with respect to the lens section on the first side wall section.

A light fixture according to the invention can illuminate both a floor and a ceiling so that light emitted to unwanted directions and potentially causing glare can be kept at a low level. When a light fixture according to an exemplifying and non-limiting embodiment is single-sided, i.e. there is a light source and a lens section on only one of the side wall sections, the light fixture can be used near to a wall so that unwanted bright spots on the wall can be avoided. Likewise, a two-sided light fixture according to an exemplifying and non-limiting embodiment can be used near a wall so that a light source on a side wall section of the light fixture that is farther from the wall is configured to produce less light than the other light source on the other side wall section that is nearer to the wall. For example, the light source on the side wall section farther from the wall can be dimmed or disconnected from an electric supply.

In accordance with the invention, there is provided also a new lighting system that comprises a floor and a ceiling to be illuminated and at least one light fixture according to the invention between the floor and the ceiling, wherein the direction perpendicular to the first and second side wall sections of each light fixture is horizontal, the first edges of the first and second side wall sections are upwards, and the second edges of the first and second side wall sections are downwards.

Various exemplifying and non-limiting embodiments are described in accompanied dependent claims.

Exemplifying and non-limiting embodiments both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features.

The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
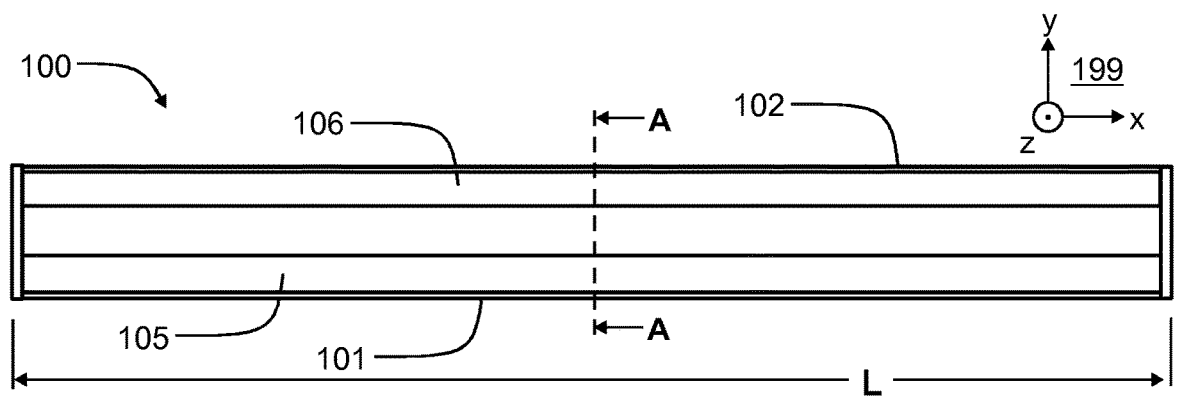
FIGS. 1a, 1b, and 1c illustrate a light fixture according to an exemplifying and non-limiting embodiment.
Figure 1B:
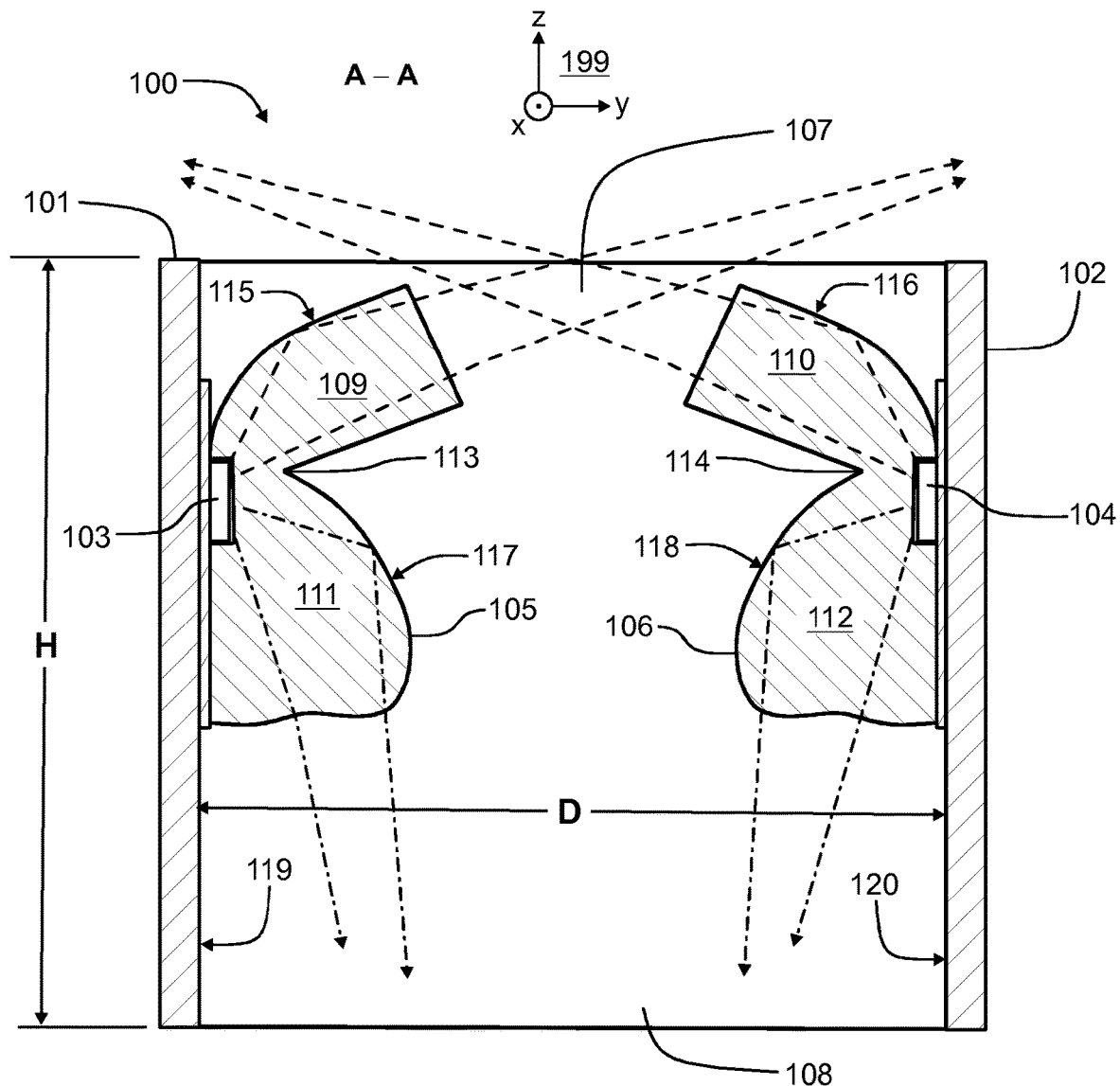

FIG. 1a shows a top view of a light fixture 100 according to an exemplifying and non-limiting embodiment. FIG. 1b shows a section taken along a line A-A shown in FIG. 1a. The geometric section plane is parallel with the yz-plane of a coordinate system 199. The light fixture 100 comprises first and second side wall sections 101 and 102 that are a distance D away from each other and have first surfaces 119 and 120 facing towards each other. In this exemplifying case, the light fixture 100 is elongated so that the length L of the light fixture 100 is at least two times the above-mentioned distance D. In a light fixture according to an exemplifying and non-limiting embodiment, the distance D between the first and second side wall sections 101 and 102 is less than or equal to the height H of the first and second side wall sections 101 and 102.

The light fixture 100 comprises a first light source 103 on the first surface 119 of the first side wall section 101 and positioned so that a maximum intensity direction of a light distribution pattern of the first light source 103 is towards the second side wall section 102. The light fixture 100 comprises a second light source 104 on the first surface 120 of the second side wall section 102 and positioned so that a maximum intensity direction of a light distribution pattern of the second light source 104 is towards the first side wall section 101. The light distribution pattern of the first light source 103 means a light distribution pattern that would exist if the light emitted by the first light source 103 were not modified. Correspondingly, the light distribution pattern of the second light source 104 means a light distribution pattern that would exist if the light emitted by the second light source 104 were not modified. The first and second light sources 103 and 104 can be for example LED strips or some other suitable elongated light sources.

The light fixture 100 comprises first and second lens sections 105 and 106 that are made of transparent material having a refractive index greater than one. The transparent material can be for example acrylic plastic, polycarbonate, optical silicone, or glass. A method of manufacture of the first and second lens sections 105 and 106 can be for example mold casting or extruding. The first lens section 105 is placed to cover the first light source 103, and the second lens section 106 is placed to cover the second light source 104. The first lens section 105 constitutes an optical diverter configured to direct a first part of light emitted by the first light source 103 obliquely via a gap 107 between first edges of the first and second side wall sections 101 and 102 and to direct a second part of the light emitted by the first light source 103 obliquely via a gap 108 between second edges of the first and second side wall sections 101 and 102. Correspondingly, the second lens section 106 constitutes an optical diverter configured to direct a first part of light emitted by the second light source 104 obliquely via the gap 107 and to direct a second part of the light emitted by the second light source 104 obliquely via the gap 108. In FIG. 1b, exemplifying light beams belonging to the first parts of the light emitted by the first and second light sources 103 and 104 are depicted with dashed line arrows and exemplifying light beams belonging to the second parts of the light emitted by the first and second light sources 103 and 104 are depicted with dash-and-dot line arrows. As illustrated in FIG. 1b, the light beams emitted by the first light source 103 are arranged to cross the light beams emitted by the second light source 104.

In a light fixture according to an exemplifying and non-limiting embodiment, the first lens section 105 comprises a first section 109, a second section 111, and a V-shaped recess 113 between the first and second sections 109 and 111 and configured to divide the light emitted by the first light source 103 to the first part exiting via the gap 107 and to the second part exiting via the gap 108. In this exemplifying case, an outermost surface 115 of the first section 109 is configured to act as a total internal reflection "TIR" surface to shape the distribution pattern of the first part of the light emitted by the first light source 103, and a surface 117 defining one side of the V-shaped recess 113 and belonging to the second section 111 is configured to act as a total internal reflection "TIR" surface to shape the distribution pattern of the second part of the light emitted by the first light source 103. It is also possible that the surface 117 is configured to act as a light refracting surface to shape the distribution pattern of the second part of the light emitted by the first light source 103. Correspondingly, the second lens section 106 comprises a first section 110, a second section 113, and a V-shaped recess 114 between the first and second sections and configured to divide the light emitted by the second light source 104 to the first and second parts of the light emitted by the second light source 104. In this exemplifying case, an outermost surface 116 of the first section 110 is configured to act as a total internal reflection "TIR" surface to shape the distribution pattern of the first part of the light emitted by the second light source 104, and a surface 118 defining one side of the V-shaped recess 114 and belonging to the second section 112 is configured to act as a total internal reflection "TIR" surface to shape the distribution pattern of the second part of the light emitted by the second light source 104. It is also possible that the surface 118 is configured to act as a light refracting surface to shape the distribution pattern of the second part of the light emitted by the second light source 104.

In a light fixture according to an exemplifying and non-limiting embodiment, the first lens section 105 is configured to direct from 25% to 75% of the light emitted by the first light source 103 to be the first part of the light emitted by the first light source 103 and correspondingly the second lens section 106 is configured to direct from 25% to 75% of the light emitted by the second light source 104 to be the first part of the light emitted by the second light source 104.

In a light fixture according to an exemplifying and non-limiting embodiment, the first lens section 105 is configured to direct at most 30% of the light emitted by the first light source 103 to be the first part of the light emitted by the first light source 103 and correspondingly the second lens section 106 is configured to direct at most 30% of the light emitted by the second light source 104 to be the first part of the light emitted by the second light source 104.

In a light fixture according to an exemplifying and non-limiting embodiment, the first lens section 105 is configured to direct at most 20% of the light emitted by the first light source 103 to be the first part of the light emitted by the first light source 103 and correspondingly the second lens section 106 is configured to direct at most 20% of the light emitted by the second light source 104 to be the first part of the light emitted by the second light source 104.

In a light fixture according to an exemplifying and non-limiting embodiment, the first lens section 105 is configured to direct at most 10% of the light emitted by the first light source 103 to be the first part of the light emitted by the first light source 103 and correspondingly the second lens section 106 is configured to direct at most 10% of the light emitted by the second light source 104 to be the first part of the light emitted by the second light source 104.

Figure 1C:
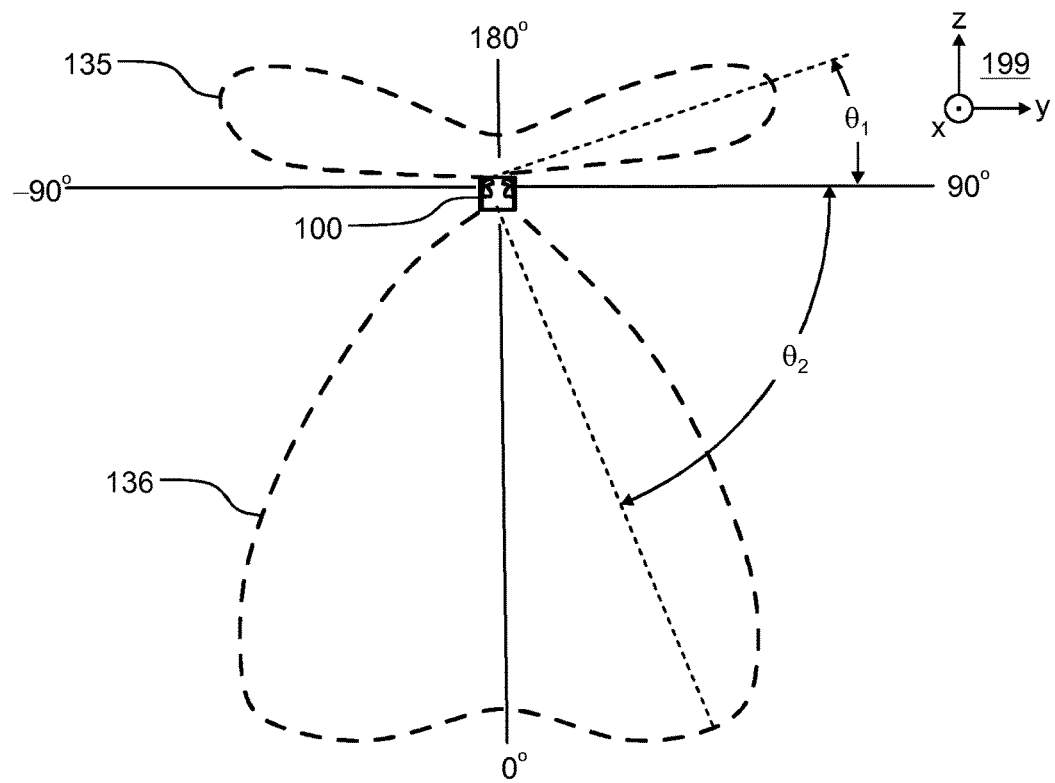

FIG. 1c illustrates a light distribution produced by the light fixture 100. A light distribution pattern 135 represents the first parts of the light emitted by the first and second light sources 103 and 104, and a light distribution pattern 136 represents the second parts of the light emitted by the first and second light sources 103 and 104. The first lens section 105 is shaped so that a first angle $\theta_1$ between a maximum intensity direction of the first part of the light emitted by the first light source 103 and a direction perpendicular to the first and second side wall sections 101 and 102 is smaller than a second angle $\theta_2$ between a maximum intensity direction of the second part of the light emitted by the first light source 103 and the direction perpendicular to the first and second side wall sections. In FIGS. 1a-1c, the direction perpendicular to the first and second side wall sections is parallel with the y-axis of the coordinate system 199. The first angle $\theta_1$ can be for example from 10 degrees to 30 degrees, and the second angle $\theta_2$ can be for example from 30 degrees to 80 degrees.

In the exemplifying light fixture 100 shown in FIGS. 1a and 1b, the second lens section 106 is mirror symmetrical with respect to the first lens section 105 and therefore, as shown in FIG. 1c, the light distribution produced by the light fixture 100 is symmetrical with respect to a geometric plane parallel with the xz-plane of the coordinate system 199. It is however also possible to that the lens sections on opposite sides of the light fixture are different from each other in order achieve an asymmetrical light distribution.

Figure 2A:
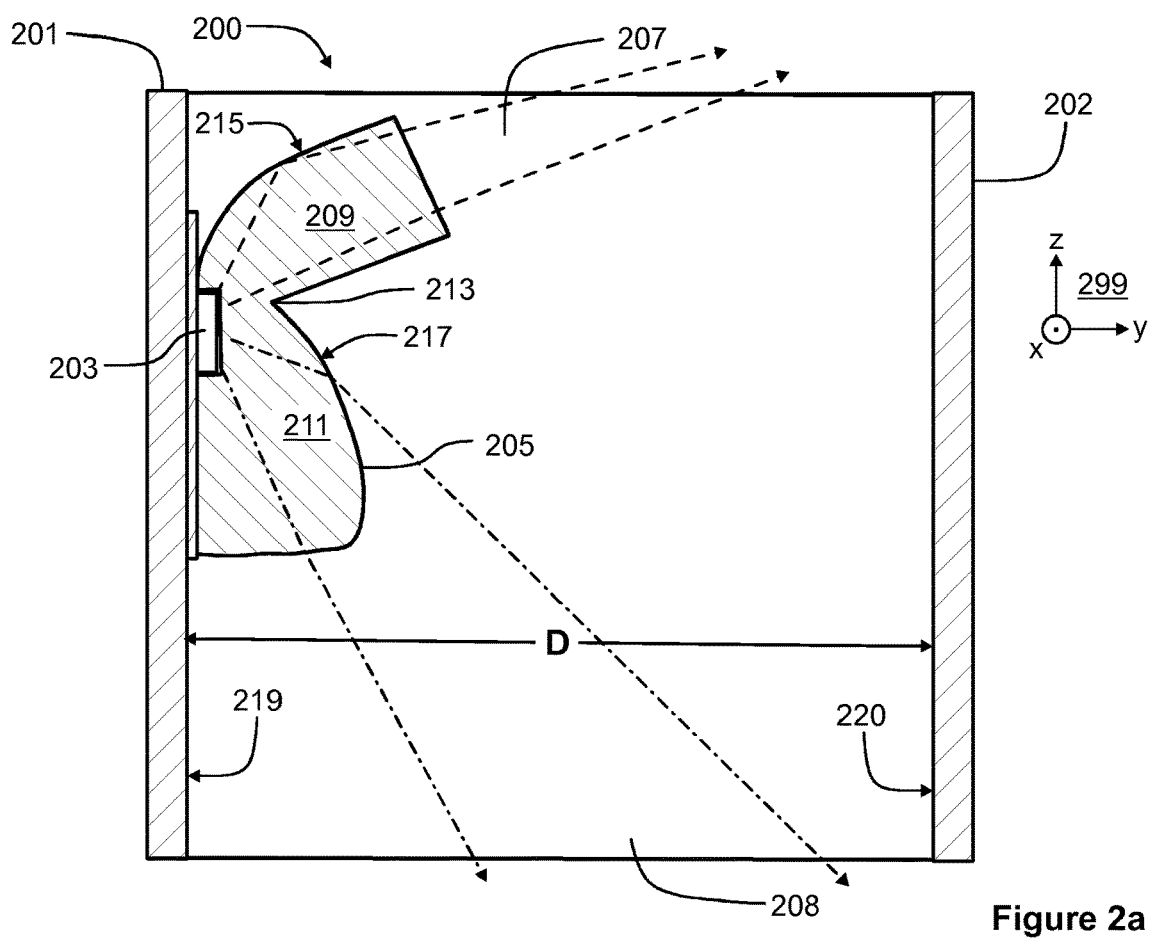
FIGS. 2a and 2b illustrate a light fixture according to another exemplifying and non-limiting embodiment.

FIG. 2a shows a section view of a light fixture 200 according to an exemplifying and non-limiting embodiment. The geometric section plane is parallel with the yz-plane of a coordinate system 299. The light fixture 200 comprises first and second side wall sections 201 and 202 that are a distance D away from each other and have first surfaces 219 and 220 facing towards each other. The light fixture 200 comprises a light source 203 on the first surface 219 of the first side wall section 201 and positioned so that a maximum intensity direction of a light distribution pattern of the first light source 203 is towards the second side wall section 202. The light distribution pattern of the light source 203 means a light distribution pattern that would exist if the light emitted by the light source 203 were not modified. The light source 203 can be for example a LED strip or another suitable light source.

The light fixture 200 comprises a lens section 205 that is made of transparent material having a refractive index greater than one. The lens section 205 is placed to cover the light source 203. The lens section 205 constitutes an optical diverter configured to direct a first part of light emitted by light source 203 obliquely via a gap 207 between first edges of the first and second side wall sections 201 and 202 and to direct a second part of the light emitted by the light source 203 obliquely via a gap 208 between second edges of the first and second side wall sections 201 and 202. In FIG. 2, exemplifying light beams belonging to the first part of the light emitted by the light source 203 are depicted with dashed line arrows and exemplifying light beams belonging to the second part of the light emitted by the light source 203 are depicted with dash-and-dot line arrows.

In a light fixture according to an exemplifying and non-limiting embodiment, the lens section 205 comprises a first section 209, a second section 211, and a V-shaped recess 213 between the first and second sections and configured to divide the light emitted by the light source 203 to the first part exiting via the gap 207 and to the second part exiting via the gap 208. In this exemplifying case, an outermost surface 215 of the first section 209 is configured to act as a total internal reflection "TIR" surface to shape the distribution pattern of the first part of the light emitted by the light source 203, and a surface 217 defining one side of the V-shaped recess 213 and belonging to the second section 211 is configured to act as a light refracting surface to shape the distribution pattern of the second part of the light emitted by the light source 203. It is also possible that the surface 217 is configured to act as a total internal reflection "TIR" surface to shape the distribution pattern of the first part of the light emitted by the light source 203.

In a light fixture according to an exemplifying and non-limiting embodiment, the lens section 205 is configured to direct from 25% to 75% of the light emitted by the light source 203 to be the first part of the light emitted by the light source 203. In a light fixture according to an exemplifying and non-limiting embodiment, the lens section 205 is configured to direct at most 30% of the light emitted by the light source 203 to be the first part of the light emitted by the light source 203. In a light fixture according to an exemplifying and non-limiting embodiment, the lens section 205 is configured to direct at most 20% of the light emitted by the light source 203 to be the first part of the light emitted by the light source 203. In a light fixture according to an exemplifying and non-limiting embodiment, the lens section 205 is configured to direct at most 10% of the light emitted by the light source 203 to be the first part of the light emitted by the light source 203.

Figure 2B:
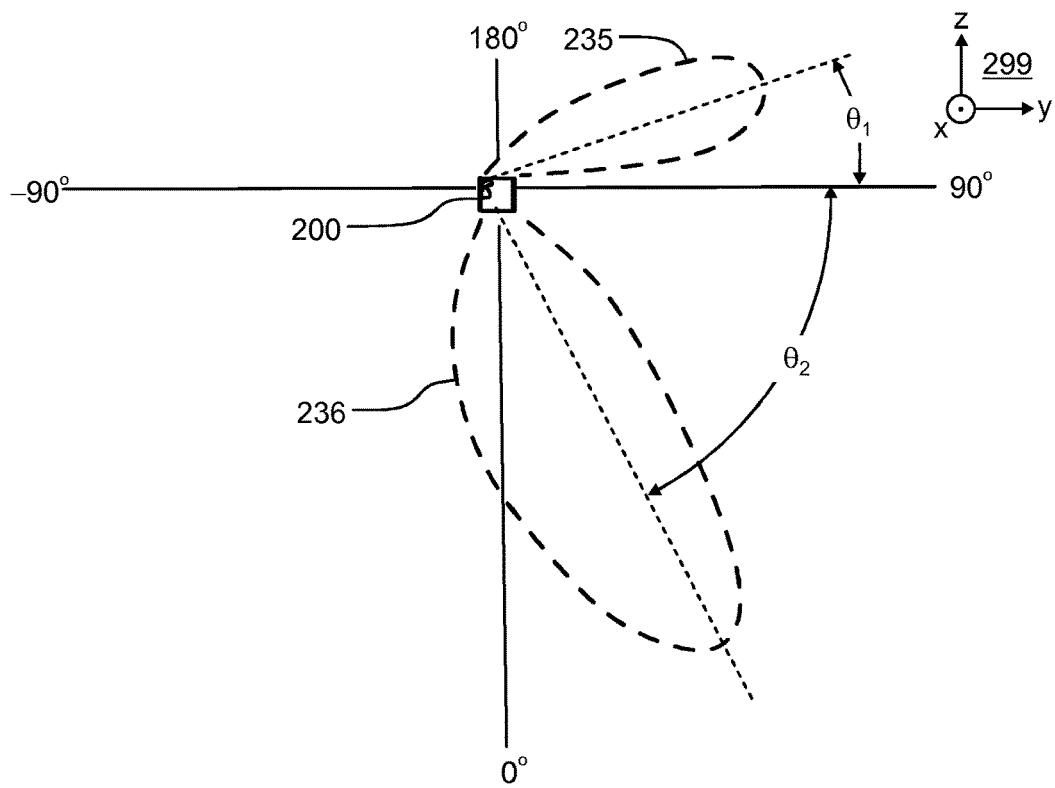

FIG. 2b illustrates a light distribution produced by the light fixture 200. A light distribution pattern 235 represents the first part of the light emitted by the light sources 203, and a light distribution pattern 236 represents the second part of the light emitted by the light source 203. The lens section 205 is shaped so that a first angle $\theta_1$ between a maximum intensity direction of the first part of the light emitted by the light source 203 and a direction perpendicular to the first and second side wall sections 201 and 202 is smaller than a second angle $\theta_2$ between a maximum intensity direction of the second part of the light emitted by the light source 203 and the direction perpendicular to the first and second side wall sections. In FIGS. 2a and 2b, the direction perpendicular to the first and second side wall sections is parallel with the y-axis of the coordinate system 299. The first angle $\theta_1$ can be for example from 10 degrees to 30 degrees, and the second angle $\theta_2$ can be for example from 30 degrees to 80 degrees.

Figure 3A:
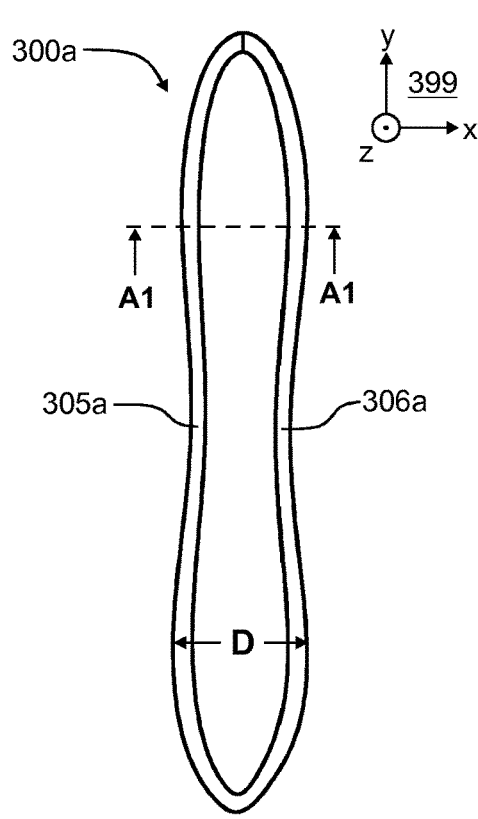
FIGS. 3a and 3b illustrate light fixtures according to exemplifying and non-limiting embodiments.
Figure 3B:
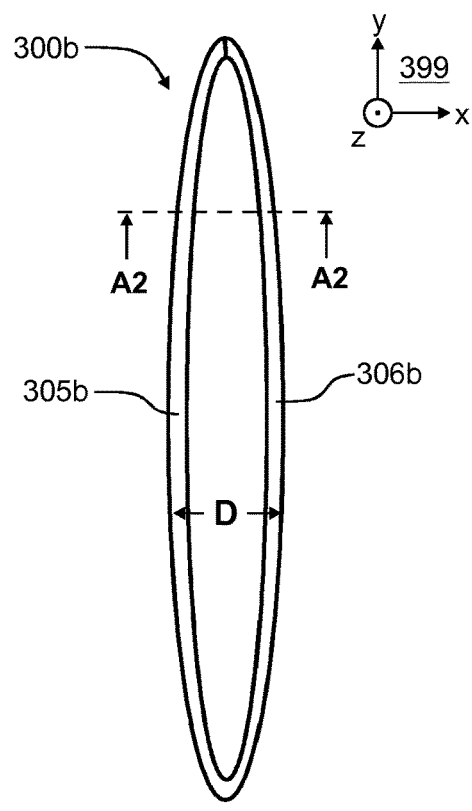

FIGS. 3a and 3b show top views of light fixtures 300a and 300b according to exemplifying and non-limiting embodiments. Sections taken along lines A1-A1 and A2-A2 can be for example like the section shown in FIG. 1b. In this exemplifying case, the side walls of the light fixtures have curved shapes so that the distance D is dependent on a position in the longitudinal directions of the light fixtures 300a and 300b. The longitudinal directions are parallel with the y-axis of a coordinate system 399. The lens sections 305a and 306a can be formed by a single lens element.

Correspondingly, the lens sections 305b and 306b can be formed by a single lens element. The lens element can be made of flexible material, such as e.g. optical silicone, which allows the lens element to be adapted to the shape of the light fixture.

Figure 4A:
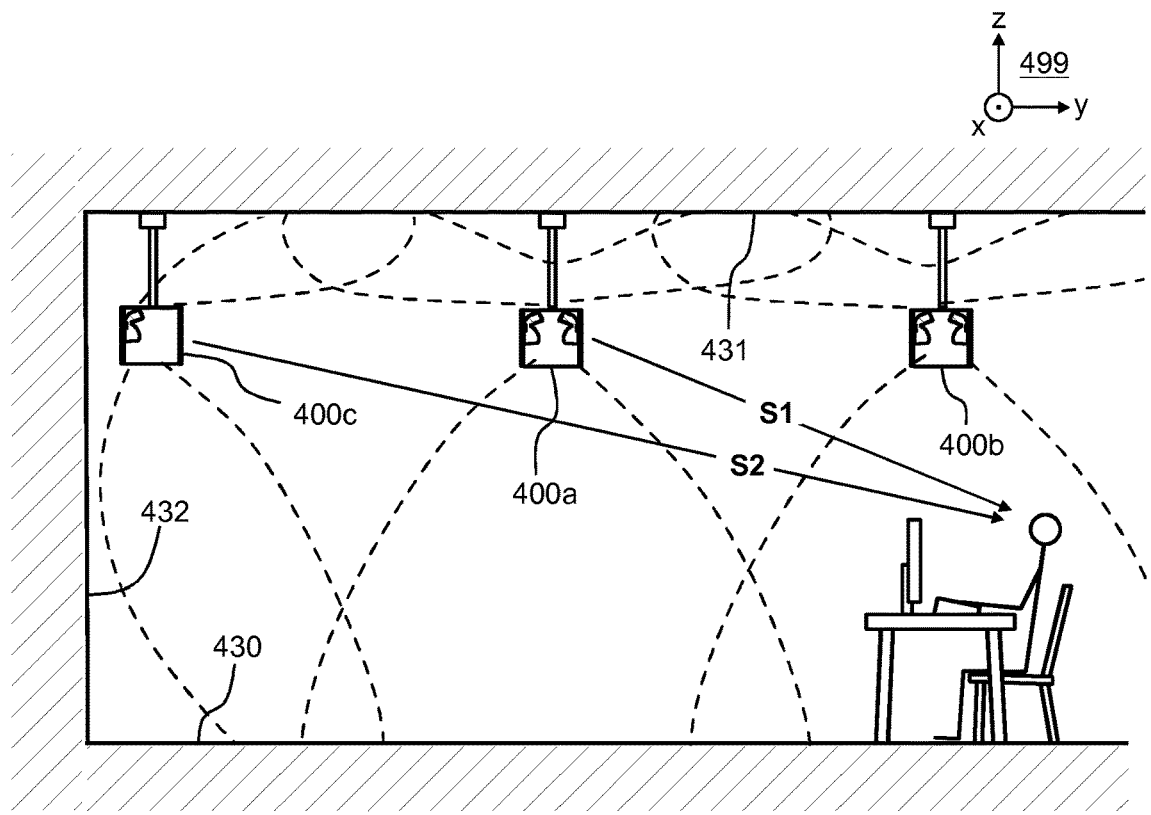
FIGS. 4a and 4b illustrate lighting systems that comprise lighting apparatuses according to exemplifying and non-limiting embodiments.

FIG. 4a illustrates a lighting system according to an exemplifying and non-limiting embodiment. The lighting system comprises a floor 430, a ceiling 431, a wall structure 432, first light fixtures 400a and 400b, and a second light fixture 400c. In this exemplifying case, the light fixtures 400a-400c are pendant luminaires between the floor 430 and the ceiling 431. The light fixtures 400a and 400b can be for example like the light fixture 100 shown in FIGS. 1a and 1b. The light fixture 400c produces more light in directions obliquely away from the wall structure 432 than in directions obliquely towards the wall structure. The light fixture 400c can be for example like the light fixture 200 shown in FIG. 2a. The light fixtures 400a-400c are installed so that the first part of light emitted by each light fixture illuminates the ceiling 431 and the second part of light emitted by each light fixture illuminates the floor 430. The distributions of light emitted by the light fixtures 40a-400c are depicted with dashed lines. With the terms used in explaining FIGS. 1a, 1b, and 2a, the installation of the light fixtures 400a-400c can be described more exactly as follows:

the direction perpendicular to the first and second side wall sections of each light fixture is horizontal and parallel with the y-axis of a coordinate system 499, the first edges of the first and second side wall sections of each light fixture are upwards, and the second edges of the first and second side wall sections of each light fixture are downwards, the first and second side wall sections of each light fixture are parallel with the wall structure 432, the light fixture 400c is positioned so that its first side wall section provided with a light source and with a lens section is nearer to the wall structure 432 than the second side wall section not provided with a light source and with a lens section.

Figure 4B:
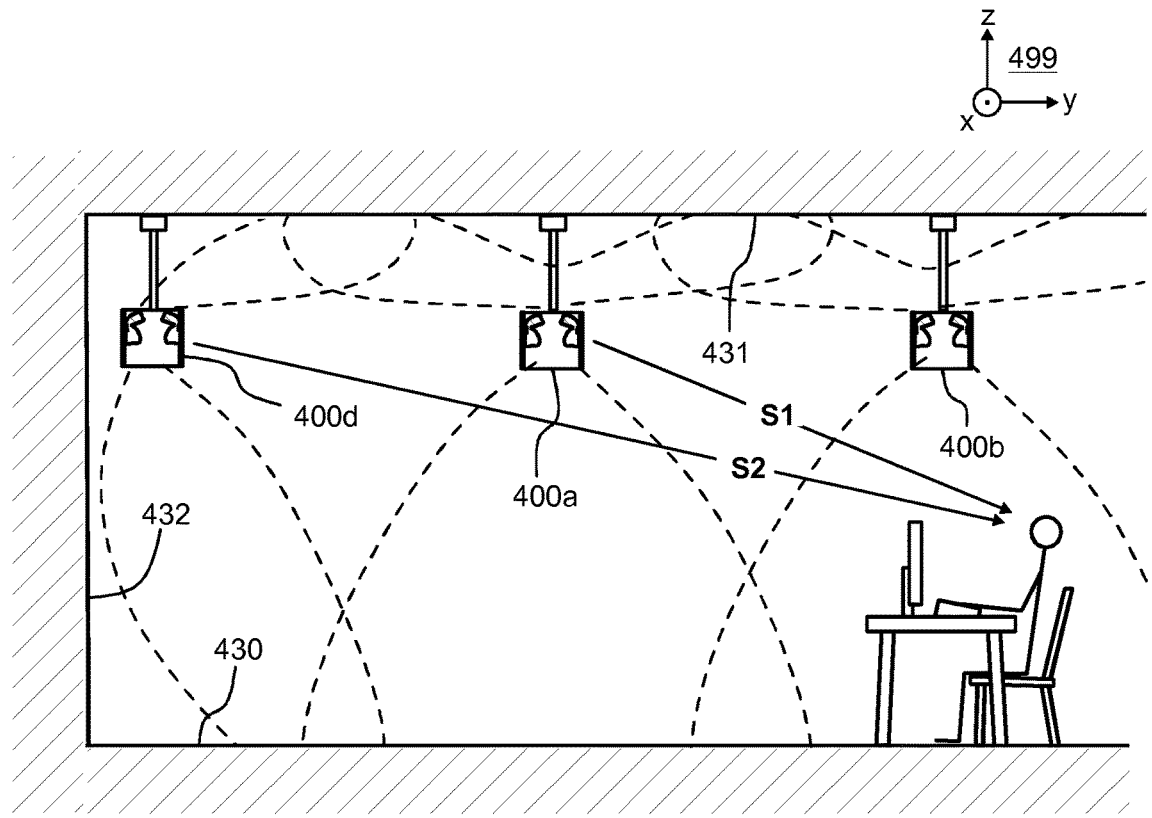

FIG. 4b illustrates a lighting system according to an exemplifying and non-limiting embodiment. The lighting system shown in FIG. 4b is otherwise like the lighting system shown in FIG. 4a, but the light fixture 400d is like the light fixture 100 shown in FIGS. 1a and 1b. The light fixture 400d produces more light in directions obliquely away from the wall structure 432 than in directions obliquely towards the wall structure. The asymmetric light distribution pattern of the light fixture 400d is implemented so that the light source of the light fixture 400d that is nearer to the wall structure 432 is configured to produce more light than the other light source of the light fixture 400d. For example, the other light source can be dimmed or disconnected from an electric supply. In the lighting system illustrated in FIG. 4b, all the light fixtures are like each other and thus a product portfolio of a light fixture vendor can simpler.

As shown in FIGS. 4a and 4b, the light fixtures do not substantially emit light in directions S1 and S2 in which the light would cause harmful glare. Furthermore, as the light distribution patterns of the light fixtures 400c and 400d are asymmetric as shown in FIGS. 4a and 4b, unwanted bright spots on the wall structure 432 can be avoided.

Figure 5:
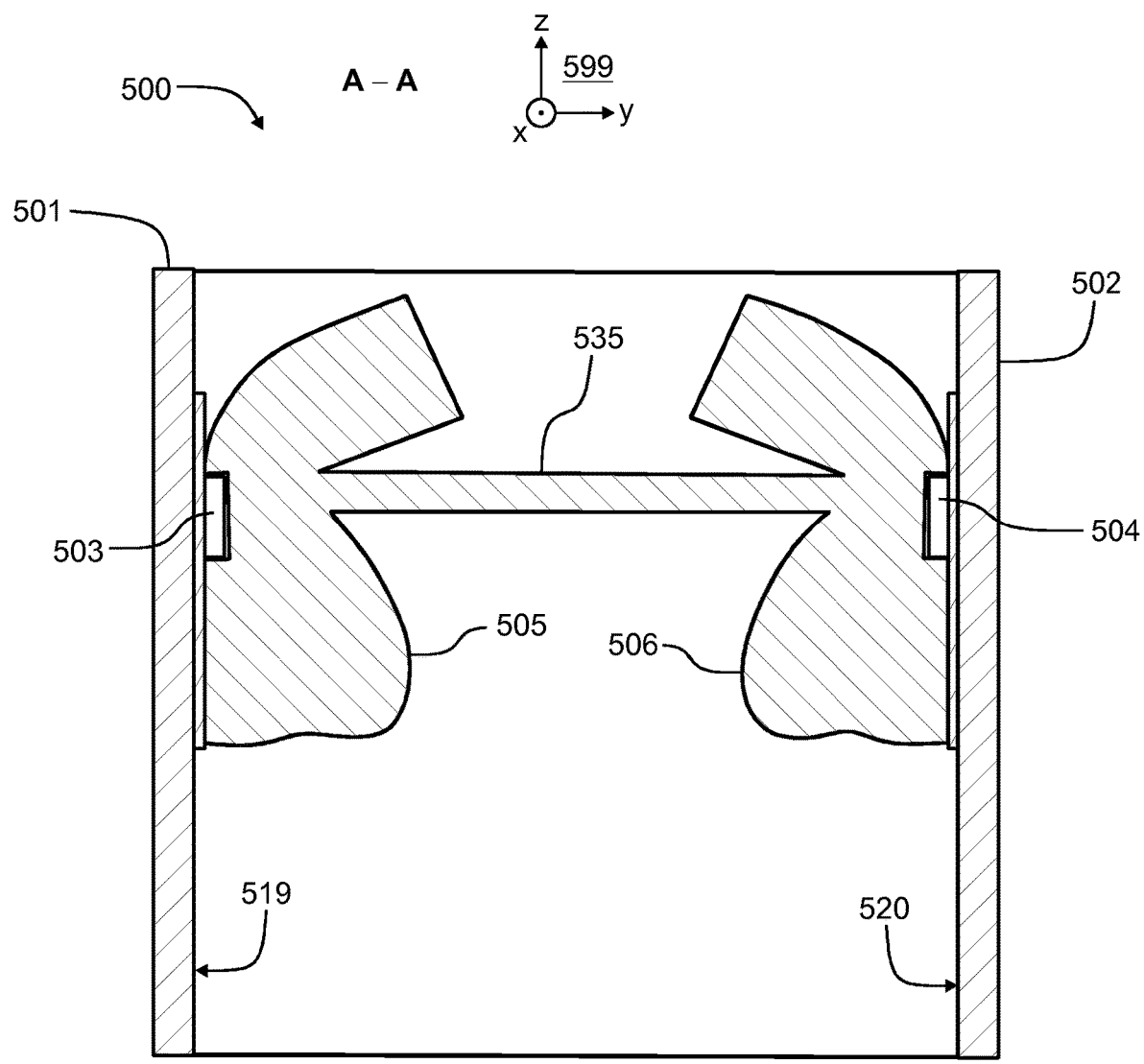
FIG. 5 illustrates a light fixture according to an exemplifying and non-limiting embodiment.

FIG. 5 shows a section view of a light fixture 500 according to an exemplifying and non-limiting embodiment. The geometric section plane is parallel with the yz-plane of a coordinate system 599. The light fixture 500 comprises first and second side wall sections 501 and 502 that are a distance away from each other and have first surfaces 519 and 520 facing towards each other. The light fixture 500 comprises a first light source 503 on the first surface 519 of the first side wall section 501 and a second light source 504 on the first surface 519 of the second side wall section 502. The light fixture 500 comprises first and second lens sections 505 and 506 that are made of transparent material having a refractive index greater than one. The first lens section 505 is placed to cover the first light source 503, and the second lens section 506 is placed to cover the second light source 504. In this exemplifying case, the first and second lens sections 505 and 506 are connected to each other by a connection section 535. The first and second lens sections 505 and 506 and the connection section 535 may constitute a single piece of the above-mentioned transparent material.

The specific examples provided in the description given above should not be construed as limiting the scope and/or the applicability of the appended claims. Lists and groups of examples provided in the description given above are not exhaustive unless otherwise explicitly stated.

What is claimed is:

1. A light fixture comprising:
first and second side wall sections being a distance away from each other and having first surfaces facing towards each other,
a first light source on the first surface of the first side wall section and positioned so that a maximum intensity direction of a light distribution pattern of the first light source is towards the second side wall section, and
a first lens section made of transparent material having a refractive index greater than one and placed to cover the first light source,
wherein the first lens section constitutes an optical diverter configured to direct a first part of light emitted by the first light source obliquely via a gap between first edges of the first and second side wall sections and a second part of the light emitted by the first light source obliquely via a gap between second edges of the first and second side wall sections, a first angle between a maximum intensity direction of the first part of the light emitted by the first light source and a direction perpendicular to the first and second side wall sections being smaller than a second angle between a maximum intensity direction of the second part of the light emitted by the first light source and the direction perpendicular to the first and second side wall sections.

2. The light fixture according to claim 1, wherein the first lens section is configured to direct from 25% to 75% of the light emitted by the first light source to be the first part of the light emitted by the first light source.

3. The light fixture according to claim 2, wherein the first angle is in a range from 10 to 30 degrees.

4. The light fixture according to claim 2, wherein the second angle is in a range from 30 to 80 degrees.

5. The light fixture according to claim 1, wherein the first angle is in a range from 10 to 30 degrees.

6. The light fixture according to claim 1, wherein the second angle is in a range from 30 to 80 degrees.

7. The light fixture according to any claim 1, wherein the first lens section comprises a first section, a second section, and a V-shaped recess between the first and second sections and configured to divide the light emitted by the first light source into the first and second parts.

8. The light fixture according to claim 7, wherein an outermost surface of the first section is configured to act as a total internal reflection surface to shape the distribution pattern of the first part of the light emitted by the first light source.

9. The light fixture according to claim 8, wherein a surface defining one side of the V-shaped recess and belonging to the second section is configured to act as a light refracting surface to shape the distribution pattern of the second part of the light emitted by the first light source.

10. The light fixture according to claim 8, wherein a surface defining one side of the V-shaped recess and belonging to the second section is configured to act as a total internal reflection surface to shape the distribution pattern of the second part of the light emitted by the first light source.

11. The light fixture according to claim 7, wherein a surface defining one side of the V-shaped recess and belonging to the second section is configured to act as a light refracting surface to shape the distribution pattern of the second part of the light emitted by the first light source.

12. The light fixture according to claim 7, wherein a surface defining one side of the V-shaped recess and belonging to the second section is configured to act as a total internal reflection surface to shape the distribution pattern of the second part of the light emitted by the first light source.

13. The light fixture according to claim 1, wherein the distance between the first and second side wall sections is less than or equal to a height of the first and second side wall sections.

14. The light fixture according to claim 1, wherein the transparent material is one of the following: acrylic plastic, polycarbonate, optical silicone, or glass.

15. The light fixture according to claim 1, wherein the light fixture comprises a second light source on the first surface of the second side wall section and positioned so that a maximum intensity direction of a light distribution pattern of the second light source is towards the first side wall section, and a second lens section placed to cover the second light source and being mirror symmetrical with respect to the first lens section.

16. A lighting system comprising a floor, a ceiling, and at least one first light fixture between the floor and the ceiling, wherein the light fixture comprises:

first and second side wall sections being a distance away from each other and having first surfaces facing towards each other,
   a first light source on the first surface of the first side wall section and positioned so that a maximum intensity direction of a light distribution pattern of the first light source is towards the second side wall section, and
   a first lens section made of transparent material having a refractive index greater than one and placed to cover the first light source,
wherein the first lens section constitutes an optical diverter configured to direct a first part of light emitted by the first light source obliquely via a gap between first edges of the first and second side wall sections and a second part of the light emitted by the first light source obliquely via a gap between second edges of the first and second side wall sections, a first angle between a maximum intensity direction of the first part of the light emitted by the first light source and a direction perpendicular to the first and second side wall sections being smaller than a second angle between a maximum intensity direction of the second part of the light emitted by the first light source and the direction perpendicular to the first and second side wall sections, and
wherein the direction perpendicular to the first and second side wall sections of the first light fixture is horizontal, the first edges of the first and second side wall sections are upwards, and the second edges of the first and second side wall sections are downwards.

17. The lighting system according to claim 16, wherein the lighting system comprises a wall structure between the floor and the ceiling, a second light fixture between the wall structure and the first light fixture, wherein
   the second light fixture comprises first and second side wall sections being a distance away from each other and having first surfaces facing towards each other, a first light source on the first surface of the first side wall section and positioned so that a maximum intensity direction of a light distribution pattern of the first light source is towards the second side wall section, and a first lens section made of transparent material having a refractive index greater than one and placed to cover the first light source, and
   the first light fixture further comprises a second light source on the first surface of the second side wall section and positioned so that a maximum intensity direction of a light distribution pattern of the second light source is towards the first side wall section, and a second lens section placed to cover the second light source and being mirror symmetrical with respect to the first lens section,
wherein the first and second side wall sections of the first and second light fixtures are parallel with the wall structure, the first side wall section of the second light fixture is nearer to the wall structure than the second side wall section of the second light fixture, and the second light fixture is configured to emit more light in directions obliquely away from the wall structure than in directions obliquely towards the wall structure.

18. The lighting system according to claim 17, wherein the second side wall section of the second light fixture is free from a light source and a lens section.

19. The lighting system according to claim 17, wherein the second light fixture comprises a second light source on the first surface of the second side wall section and positioned so that a maximum intensity direction of a light distribution pattern of the second light source is towards the first side wall section, and a second lens section placed to cover the second light source and being mirror symmetrical with respect to the first lens section, and the second light source on the second side wall section of the second light fixture is configured to produce less light than the first light source on the first side wall section of the second light fixture.

* * * * *